Sept. 8, 1931.  D. W. DALEY  1,822,802
BUILDING BLOCK
Filed Oct. 8, 1928

Dennis W. Daley, Inventor
By C. A. Snow & Co.
Attorneys

Patented Sept. 8, 1931

1,822,802

UNITED STATES PATENT OFFICE

DENNIS WILLIAM DALEY, OF PARKERSBURG, WEST VIRGINIA

BUILDING BLOCK

Application filed October 8, 1928. Serial No. 311,186.

By way of explanation, it may be stated that it is often desirable to have a tile for building purposes which is of extraordinary length. A long tile, however, is hard to manufacture, and this invention aims to provide a novel means whereby two tiles may be joined, making an article of building material which is of unusual length.

In the accompanying drawings:—

This invention comprises a method of joining tiles, which comprises standing up a first tile 1 in a substantially vertical position, preferably on a pallet 2, and placing a mass 3 of cement in the upper end of the first tile 1.

Figure 4:
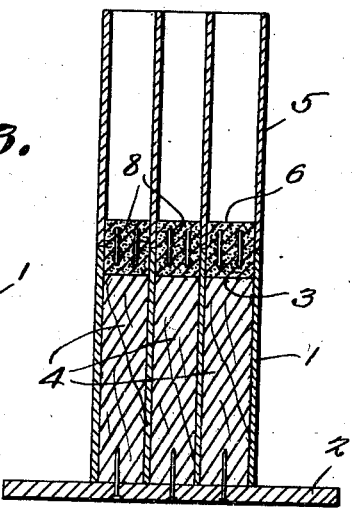
Figure 4 is a longitudinal vertical section showing the advances in the process.

The mass of cement shown at 3 is supported by any suitable means, such as posts 4, entering the first tile 1 and secured to the pallet 2. A second tile 5 is stood up on the upper end of the first tile 1, and a mass 6 of cement is placed in the lower end of the second tile 5, the tiles being permitted to stand as described, and as shown in Figure 4, until the two masses 3 and 6 of cement have time to coalesce and set. The result is that the tiles 1 and 5 are joined together by an internal monolithic bond.

Figure 1:
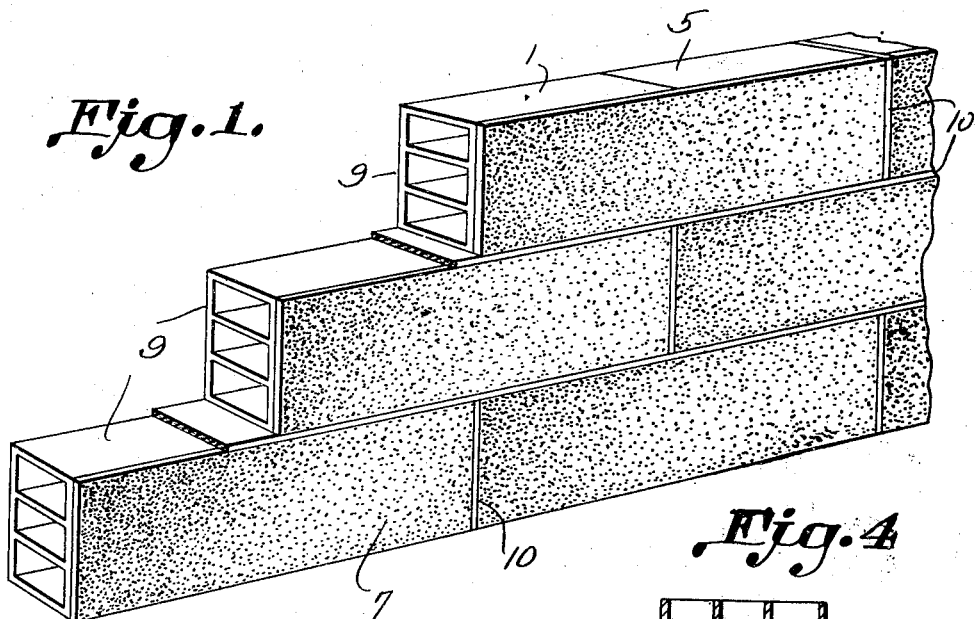
Figure 1 shows in perspective, a portion of a wall made of articles of building material constructed in accordance with the invention.
Figure 2:
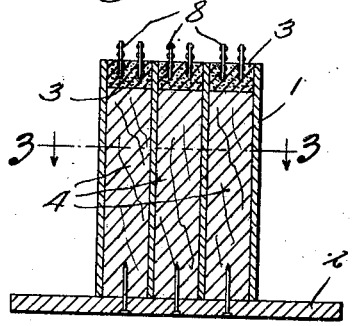
Figure 2 is a sectional view showing one step in the process hereinafter claimed.
Figure 3:
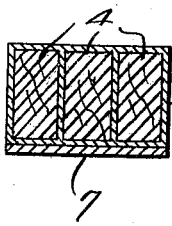
Figure 3 is a cross section of the line 3—3 of Figure 2.
Figure 5:
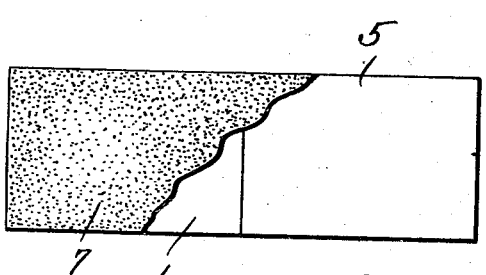
Figure 5 is an elevation disclosing the complete article, a portion of the facing being broken away.

The method above described is further characterized by the step which consists in applying a continuous coating 7 of stucco or the like to certain surfaces of both tiles, as indicated in Figure 5, and as clearly shown in Figure 1.

The method, moreover, is characterized by a further step which consists in mounting projecting reinforcements 8 in the mass of cement shown as 3, and inserting the reinforcements in the mass of cement shown as 6, while the second tile 5 is standing on the first tile 1, as hereinbefore described.

The method produces an article of building material of unusual length, shown as 9, and capable of being employed for many purposes, for instance, in laying up a wall, mortar being used in the wall wherever necessary as shown at 10.

I claim:—

1. A method of joining tiles, which consists in standing up a first tile in a substantially vertical position, placing a mass of cement in the upper end of the first tile and supporting it there, in spaced relation to the lower end of the first tile whilst the first tile is in the aforesaid substantially vertical position, standing up a second tile on the upper end of the first tile, placing a mass of cement in the lower end of the second tile, and permitting the two masses of cement to coalesce and set.

2. A method of joining tiles, which consists in standing up a first tile in a substantially vertical position, placing a mass of cement in the upper end of the first tile: in a single step, retaining the first tile in a substantially vertical position and holding the mass of cement in spaced relation to the lower end of the first tile whilst the first tile is in the aforesaid position: standing up a second tile on the upper end of the first tile, placing a mass of cement in the lower end of the second tile, and permitting the two masses of cement to coalesce and set.

3. A method of joining tiles, which consists in standing up a first tile in a substantially vertical position, placing a mass of cement in the upper end of the first tile: in a single step, retaining the first tile in a substantially vertical position and holding the mass of cement in spaced relation to the lower end of the first tile whilst the first tile is in the aforesaid position: standing up a second tile on the lower end of the first tile, placing a mass of cement in the lower end of the second tile, permitting the two masses of cement to coalesce and set, and applying a continuous coating to some of the outer surfaces of both tiles, in a single continuous length, whilst the tiles are held in coaxial relation by means of the steps hereinbefore specified.

In testimony that I claim the foregoing as my own, I have hereto affixed my signature.

DENNIS WILLIAM DALEY.